Aug. 12, 1941.   C. A. CAMPBELL   2,251,979
SAFETY VALVE
Filed April 2, 1940

Inventor
Charles A. Campbell
By Dodge and Sons
Attorneys

Patented Aug. 12, 1941

2,251,979

UNITED STATES PATENT OFFICE 2,251,979

SAFETY VALVE

Charles Albert Campbell, Watertown, N. Y., assignor to The New York Air Brake Company, a corporation of New Jersey Application April 2, 1940, Serial No. 327,525

2 Claims. (Cl. 137—53)

This invention relates to safety valves and particularly to structural features relating to the adjusting mechanism, and protection thereof from tampering, and from accidental derangement by mud, snow or ice.

Safety valves are known in which a piston-like, spring-urged poppet valve controls a discharge port and is interposed between that port and a reaction chamber which is closed except for adjustable vent ports leading to atmosphere. Such valves have one or more reaction shoulders which are exposed to discharging pressure fluid as the valve opens, and the valve, or its guide, or both, are so ported as to connect the space below a reaction shoulder with the reaction chamber at certain times.

Such valves vary widely in detail, particularly as to the last-named porting, but as a class are characterized by the fact that variable throttling of the vent ports from the reaction chamber controls the "blow-down" or pressure drop between opening and closing of the valve.

A typical example of the general class of valves is shown in Patent No. 2,165,611, granted to Campbell and Safford, July 11, 1939.

The present invention will be illustrated as incorporated in a large capacity precise acting valve for which Safford and Love have filed patent application, Serial No. 310,992, on December 26, 1939, and the subject matter of that application is not herein claimed except as elements of it may form new patentable combinations with features first disclosed in the present application. The Safford and Love application above identified eventuated in Patent No. 2,221,724 on November 12, 1940.

According to the prior art, the vent ports and the main discharge ports led through the body of the valve and the adjustable throttling means was a ring threaded on the valve body. This exposure of the parts is objectionable for various reasons. The present invention affords a simple two-part shrouding structure and involves a simple throttling means associated with and preferably forming the guide for the spring plunger stem. The construction is such that the ports are protected, and removal of one component of the shrouding structure gives access to the means for adjusting throttling (blow down adjustment) and also the means for adjusting the spring stress (pressure setting). The other component swivels on the body and has a discharge pipe connection which may be variously positioned.

A preferred embodiment of the invention is shown in the accompanying drawing, in which.

Figure 2:
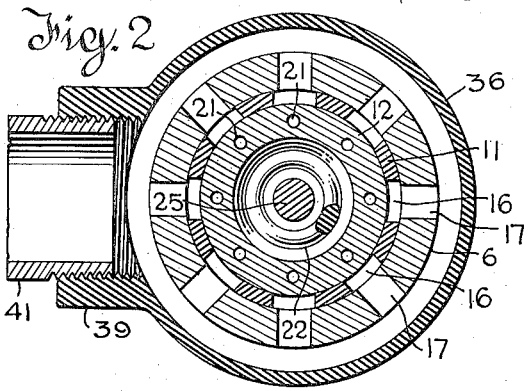
Fig. 2 is a section on the line 2—2 of Figure 1.
Figure 3:
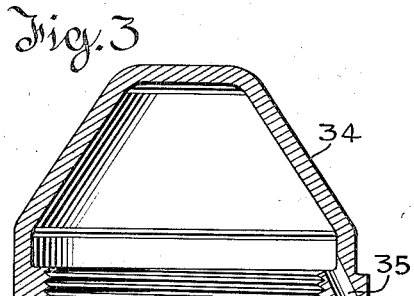
Fig. 3 is a view of the cap and shroud, each shown in section, indicating how these parts are withdrawn from the main structure of the valve which is shown in elevation.
Figure 1:
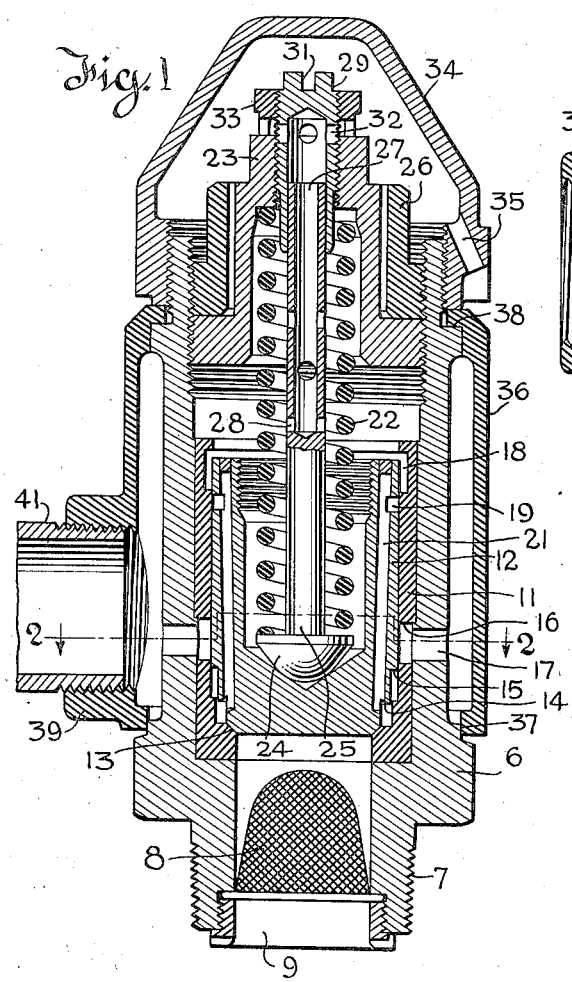
Figure 1 is a vertical axial section through the complete valve structure.

Referring particularly to Figures 1 and 2, the body of the valve is indicated at 6 and is provided with a nipple 7 which is pipe-threaded to form a connection with the pressure vessel to which the valve is applied. A thimble-shaped strainer 8 is retained by a threaded ring 9.

In the particular embodiment shown, the body 6 of the valve is formed of cast-iron and therefore is provided with an internal bushing 11 which is pressed to place and which serves as a guide and also as a seat for a cup-shaped piston-like poppet valve generally indicated by the numeral 12.

The bushing 11 has an internal shoulder at its lower end, and upon this is formed the conical valve seat 13 with which the valve 12 coacts. Above the seat 13 there are reaction shoulders which are opposed to corresponding reaction shoulders 14 and 15 on the valve. The bushing 11 is provided with discharge ports 16 which align with discharge ports 17 in the body 6. The lower margin of the port 16 is above the reaction shoulder 15 when the valve is closed. The upper end of the bushing is above the upper end of the valve when the latter is closed.

Formed in the bushing so as to be exposed by the upper end of the valve when closed is an annular groove 18. Encircling the valve is an annular groove 19 which is spaced from the top of the valve a distance less than the width of the groove 18 but sufficiently great to assure that the two grooves do not communicate when the valve is closed. The groove 19 is connected with the space below the lower reaction shoulder 14 by a series of drilled ports 21, eight of which are indicated in Figure 2.

So far as is necessary for present purposes, it may be said that as the valve moves away from the seat, first the shoulder 14 and then the shoulder 15 is exposed to discharging pressure fluid so that the valve receives an increasing impetus in an opening direction. Shortly after the shoulder 15 is exposed to discharging pressure fluid it clears the lower margin of the port 16 and discharge flow commences. Shortly before discharge flow commences a path is opened via ports 21, groove 19 and groove 18 to the space above the valve 11, but little flow then occurs, because, at that time the valve is moving very rapidly, and the flow path is immediately interrupted when the top edge of the valve overtravels the upper edge of groove 18. In the slower closing movement of the valve the same path to the space above the valve is reestablished and causes a sudden rise of pressure above the valve. This accelerates the closing movement and ensures sharp closure.

The valve 12 is urged to its seat by a coil compression spring 22. This reacts at its upper end against a spring seat 23. In order to deliver the thrust of the spring to the valve without danger of cocking the valve, the spring 22 reacts downward against the head 24 on a stem 25, the stem being guided at its upper end in the spring seat 23 as will later be described. The spring seat is threaded into the upper end of the valve body 6 and is locked in adjusted position by a jam nut 26.

In the prior art structures, the reaction chamber between the valve 12 and the spring seat 23 was vented to atmosphere through adjustable ports which extended through the walls of the body 6. This required the use of a cap, one of whose functions was to prevent leakage to atmosphere around the stem corresponding to stem 25 of the present structure.

According to the present invention, the venting occurs through the stem guide, and for this reason the stem has an axial bore 27 with which a number of lateral ports 28 freely communicate at all times.

Instead of guiding the stem 25 directly in the bore of the spring seat member 23, I prefer to form the guide in a threaded bushing 29 which is closed at its upper end and provided with a screw driver slot 31 by means of which it may be turned. This bushing 29 is threaded into an axial bore in the spring seat 23, receives the upper end of the stem 25 and is provided with a plurality of lateral ports 32, four such ports being indicated in the drawing. By turning the bushing 29, the ports 32 are exposed more or less above the upper margin of the spring seat 23. In this way, leakage between the guide and the stem is immaterial and the rate of venting flow is controlled solely by the degree of exposure of the ports 32.

After the bushing 29 has been adjusted, it is locked by means of a castellated nut 33, the castellations on the nut being counterbored so as not to blind ports 32 and being turned downward so as to afford paths of flow from the ports 32.

Obviously, the pressure setting of the valve is determined by adjusting the spring seat 23 and the blowdown is adjusted by turning the bushing 29 to expose more or less of the ports 32. Thus, the cap 34, which is screwed onto external threads formed in the upper end of the body 6, is merely a protective closure and not a seal as it was in the prior art device. On the contrary, it is provided with a lateral downwardly extending port 35 which vents the space within the cap to atmosphere. The location and arrangement of this port are such as to protect it from closure by mud or sleet, under ordinary conditions of use out-of-doors. This is an important consideration where the valve is mounted on a locomotive.

To further protect the valve, and particularly the main discharge ports 17, sleeve 36 is provided. This extends downward beyond the ports 17 and fits a circular portion indicated at 37. At its upper end it has an inturned flange which seats on a shoulder 38 formed on the body of the valve and which is clamped against the shoulder by the threaded cap 34. The sleeve 36 is provided with a ported boss 39 which is pipe-threaded to receive a discharge pipe 41 which may be led to any remote point of discharge. The use of the pipe 41 is optional but is commonly desirable. It will be observed that the sleeve 36 will swivel on the body 6 so that the pipe 41 may extend in any desired direction. It will further be observed that removal of the cap 34 gives access to both adjusting mechanisms.

The adjusting bushing 29 herein described gives very accurate control of the venting characteristic. The bushing 23 and its jam nut 26 produce an approximately tight seal with the body. The stem 25 can be freely fitted in the bushing 29 because leakage at this point is immaterial in view of the fact that the throttling control is had at the ports 32. In fact, the ports 28 and the axial bore 27 are provided to facilitate flow past the guide bearing.

It is obvious that it is not necessary to construct the guide for the stem 25 and the adjustable throttling bushing as a single piece, but it is convenient to do so.

No positive stop is provided to limit the opening movement of the valve 12 and the stem 25, this for the reason that after the valve opens, the lifting force on the valve falls and the resistance of the spring increases, so that the opening movement ceases before the stem 25 reaches the end of the bore in the bushing 29 and, in fact, before the ports 32 in the bushing are throttled by the end of the stem.

In the prior art construction, in which the space behind the poppet valve was vented directly to atmosphere by ports formed in the sides of the valve housing, it was impracticable to apply a protecting sleeve or muffle such as that shown at 36, because the ports were controlled by a throttling ring threaded on the outer side of the body, and there was no convenient way of applying the protective sleeve. The scheme of venting the space through the stem guide, or, more specifically, through the stem itself, as shown in the present application, permits the venting to occur through the cap 34, and thus makes possible the use of the sleeve 35 and the very simple scheme of retaining it by means of the cap 34. Thus, the venting control disclosed in the present application has a number of practical advantages. It is more precise, because less subject to deranging leakage. It brings both adjustments, that is, the one for spring stress and the other for throttling effect, to a single point, so that both adjustments can be made at that point after the cap 34 has been removed. Further, the replacement of this cap protects both adjusting mechanisms against tampering. Finally, the vent ports are better protected than they were in the prior structure and it becomes possible to apply to the valve the sleeve 36, which not only protects the main exhaust ports, but also permits exhaust flow to be piped conveniently to a satisfactory point of unit discharge.

Thus, while the basic operative principle of the valve is the same as that of the Safford and Love application above identified, the particular arrangement and combination of parts set forth in the present application results in improved operating characteristics and very marked practical advantages.

Minor modifications within the scope of the claims are possible and are contemplated, and certain aspects of the invention can be applied to a safety valve differing somewhat in construction and principle of operation from the Safford and Love valve.

What is claimed is:

1. In a safety valve, the combination of a valve body having a passage adapted for connection with the pressure vessel from which pressure fluid is to be vented, a valve seat surrounding said passage and main discharge ports leading through the valve body from a point beyond said seat; a piston-like poppet valve guided in said body to move toward and from said seat and adapted to seal thereagainst, said valve being provided with at least one reaction shoulder exposed to discharging pressure fluid when the valve is open, the valve and its guide being formed with coacting ports which at certain times when the valve is away from its seat connect said reaction shoulder with the space behind the valve; a spring seat adjustable in the valve body and together with such body enclosing a reaction chamber behind the valve; a spring reacting between the spring seat and said valve in a valve closing direction; a valve stem guided in the spring seat, said stem being ported to afford a venting flow path from said chamber through the guided end of the stem; and means having a vent port, said means being mounted on said spring seat but adjustable independently thereof to vary the rate of flow through the ported end of said stem.

2. In a safety valve, the combination of a valve body having a passage adapted for connection with the pressure vessel from which pressure fluid is vented, a valve seat surrounding said passage and main discharge ports leading through the valve body from a point beyond the said seat; a piston-like poppet valve guided in said body to move toward and from said valve seat and adapted to seal thereagainst, said valve being provided with at least one reaction shoulder exposed to discharging pressure fluid when the valve is open, the valve and its guide being formed with coacting ports which at certain times when the valve is away from its seat connect said reaction shoulder with the space behind the valve; a spring seat adjustable in the valve body and together therewith enclosing a reaction chamber behind the valve, said spring seat having a threaded bore axially aligned with the valve; a guide sleeve threaded in said bore and having lateral ports whose exposed area may be varied by turning the guide, a spring reacting between said spring seat and the valve in a valve closing direction; and a valve stem guided in said sleeve moving with said valve and ported to afford a flow path from said chamber to the ports in the sleeve.

CHARLES ALBERT CAMPBELL.